United States Patent [19]
Genster

[11] Patent Number: 6,033,183
[45] Date of Patent: Mar. 7, 2000

[54] IMPELLER FOR A ROTARY PUMP

[75] Inventor: Albert Genster, Marl, Germany

[73] Assignee: Wilo GmbH, Dortmund, Germany

[21] Appl. No.: 09/002,622

[22] Filed: Jan. 15, 1998

[30] Foreign Application Priority Data

Jan. 16, 1997 [DE] Germany .......................... 197 01 297

[51] Int. Cl.[7] ..................................................... B63H 1/16
[52] U.S. Cl. ................................. 416/186 R; 416/186 A; 416/241 A; 416/183; 416/188; 416/189; 416/192
[58] Field of Search ............................ 416/186 R, 186 A, 416/241 A, 183, 188, 189, 192, 194, 195; 249/59; 264/318; 425/DIG. 58

[56] References Cited

U.S. PATENT DOCUMENTS

| | | | |
|---|---|---|---|
| 4,428,717 | 1/1984 | Catterfeld | 416/186 R |
| 4,720,242 | 1/1988 | Lovisetto | 416/186 A |
| 4,759,690 | 7/1988 | Deschamps et al. | 416/186 R |
| 4,817,856 | 4/1989 | Koistinen et al. | 228/176 |
| 4,838,762 | 6/1989 | Savage et al. | 416/187 |
| 5,435,960 | 7/1995 | Bressler et al. | 264/221 |
| 5,538,395 | 7/1996 | Hager | 416/144 |
| 5,611,668 | 3/1997 | Yapp et al. | 416/189 |

FOREIGN PATENT DOCUMENTS

| | | |
|---|---|---|
| 2 366 469 | 4/1978 | France . |
| 1403052 | 1/1969 | Germany . |
| 2306409 | 9/1973 | Germany . |
| 37 01 085-C | 1/1988 | Germany . |
| 37 13 310 | 8/1988 | Germany . |
| 1 048 364 | 11/1966 | United Kingdom . |

OTHER PUBLICATIONS

WPI English Abstract of FR 2366469–A, Elektrobau Mulfingen GmBh, published 1978, Jun. 2, 1978.
WPI English Abstract of DE 3701085–B, Ossner/BMW, published 1988, Jan. 14, 1988.
WPI English Abstract of DE 3713310–A, Schaffer/BMW, published 1988, Aug. 25, 1988.

*Primary Examiner*—Edward K. Look
*Assistant Examiner*—Matthew T. Shanley
*Attorney, Agent, or Firm*—Milton Oliver; Ware, Fressola, Van der Sluys & Adolphson LLP

[57] ABSTRACT

The invention relates to an impeller of a rotary pump having an annular upper part defining a central inlet opening, a drive-adjacent disk-shaped lower part, and a plurality of blades secured between the upper and lower parts. The upper and lower parts are separate parts which secure together. Each blade is integrally formed with either the upper part or the lower part. Every other blade is formed with the upper part, and the remaining blades are formed with the lower part. Each blade has a free edge, remote from a base thereof, which has a projection which extends into a recess or opening formed in the part to which it is not integrally molded. After the upper and lower parts are assembled together, free spaces around the projections are filled with injected plastic, thereby securing the upper and lower parts together and securing the free ends of the blades. This structure and molding process have the advantages of permitting arbitrarily curved impeller blades and facilitating manufacture in a minimum number of operating steps.

10 Claims, 1 Drawing Sheet

IMPELLER FOR A ROTARY PUMP

FIELD OF THE INVENTION

The present invention relates generally to rotary pumps, and more particularly, to an impeller for a rotary pump with an annular upper part defining a central inlet, a drive-adjacent circular disk-shaped lower part, and a plurality of blades secured between the upper and lower parts.

BACKGROUND

It is conventional to manufacture impellers of the aforementioned kind as a single piece by smelting or from multiple pieces by ultrasound welding. Both manufacturing methods are expensive and fail to result in sufficiently small production tolerances. Further, one can hardly make blades with curvatures in three-dimensional geometry.

SUMMARY OF THE INVENTION

Accordingly, it is an object of the present invention to improve an impeller of the aforementioned kind to that it can be manufactured simply and economically by as few working steps as possible.

Briefly, this is achieved by: making the upper and lower parts as separate parts, connectable to each other, forming each blade only on the upper part or only on the lower part, forming each blade with a free edge remote from the connection point to the upper or lower part on which the blade is formed, the free edge having a projection which extends into a recess or opening of the lower part or upper part, when the upper and lower parts are secured together, and forming the recesses or openings with free spaces which, in the assembled state of the upper and lower parts, surround the projections, and into which plastic can be injected, in that assembled state.

The impeller can be manufactured, without ultrasound welding steps and without smelting, in a one-, two-, three- or four-component process. This can be done in single-workpiece tools with manual insertion or fully automatically in multiple-workpiece tools. In the same tool, one can first injection-mold the upper and lower parts, and then assemble together the upper and lower parts, in order to inject the connecting quantity of plastic. The advantages are, among others:

inseparable connection;

lower production tolerances in circular and linear running, compared to welded impellers;

high-value, and thus cost-intensive, materials can be inserted in targeted local regions;

smaller unit costs, compared to impellers made by smelting techniques; and higher operating efficiency, compared to welded impellers, in which no 3-D geometry of the blades is possible.

Preferably, every second blade is formed on the upper part, and the blades lying between are formed on the lower part. This way, during their manufacture, the blades have double the spacing from each other that they will have later in the finished impeller, so that the blades can be made with high precision and in any desired curvature. This also means one can provide a large number of blades in the impeller.

An optimal distribution of the plastic mass connecting the parts, and high stability of the impeller, are achieved if the injected plastic, at the free spaces, forms a respective coaxial ring at the outer rim of the upper part, of the lower part, and/or at the central inlet opening, the ring connecting to the plastic injected into the free spaces. This way, the plastic injected at the central inlet opening can form a sealing surface to the pump housing inner wall.

Preferably, a hub, centrally located in the lower part, especially for mounting on the shaft of a drive motor, is formed in the same injection step and of the same plastic injection material as that placed in the free spaces. This way, the hub can be connected to the plastic placed in those free spaces which are in the lower part.

BRIEF FIGURE DESCRIPTION

FIG. 1 illustrates a preferred embodiment of the impeller of the present invention, in an axially exploded view, the plastic connecting masses injected in the last working step into the upper part and lower part being shown separated.

DETAILED DESCRIPTION

Figure 1:
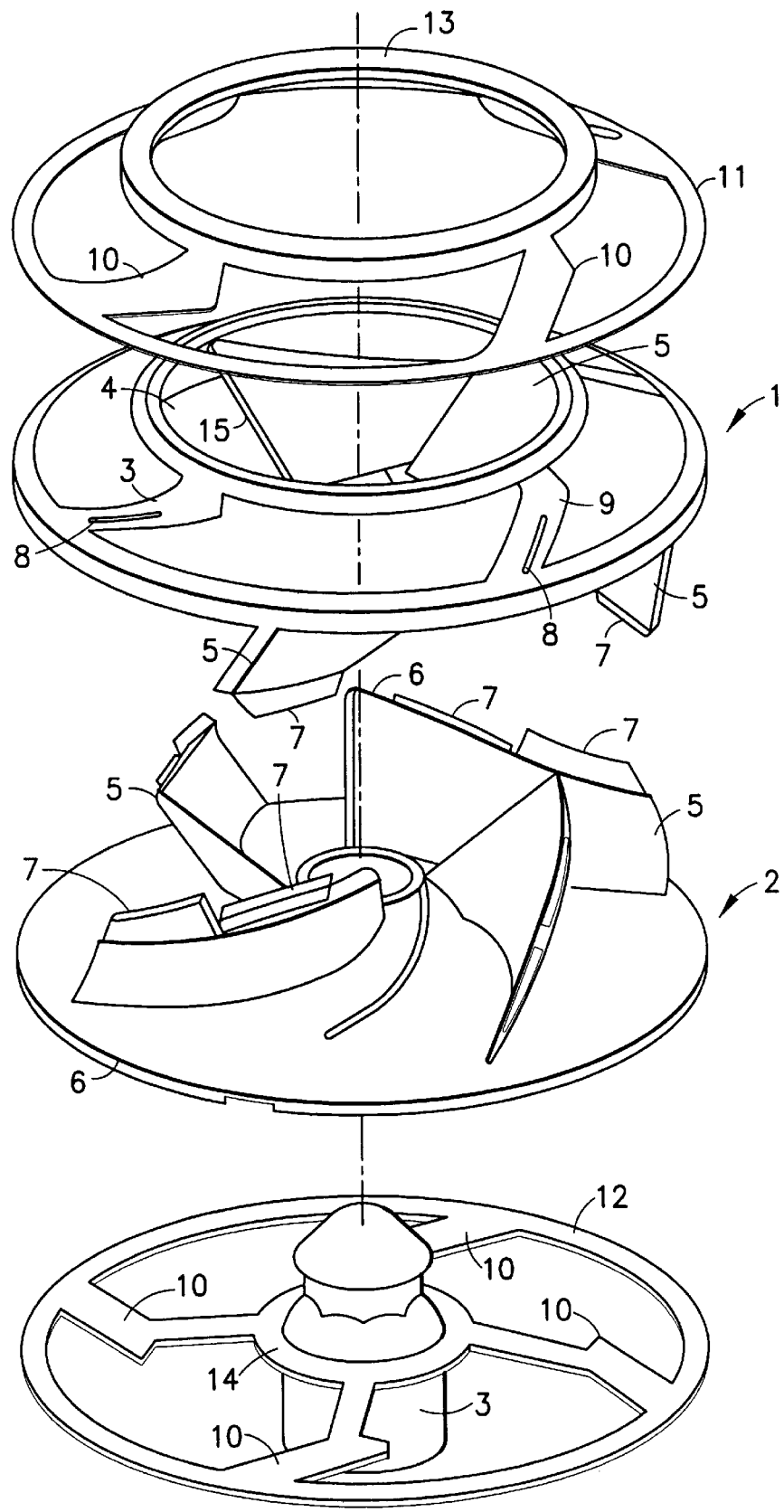

The impeller of the rotary pump of the present invention is made, in all significant parts, of plastic, and has an annular upper part 1 and a disk-shaped lower part 2. These two parts are secured coaxially to each other, the lower part 2 having a central coaxial hub, with which the impeller can be mounted on the end of a shaft of an electric motor. Upper part 1 has, on the side remote from the lower part, a coaxial inlet opening 4, through which the fluid to be pumped is introduced. A preferred plastic is polypropylene, reinforced with 20%–40% by weight glass fibers.

Between upper part 1 and lower part 2, there is a space, in which essentially radially oriented and 3-D-curved blades 5 are secured. Every second blade 5 is formed onto the underside of upper part 1, and the other blades 5 therebetween are formed on the upper side of lower part 2. All blades 5 have, on their free edges 6, which later will abut the other part 1 or 2 after assembly, projections 7 which, in the assembled state, extend into openings 8 of the other part. These projections 7 extend through the upper or lower part to the outer surface thereof. In the respective outer surface, there are free spaces or voids 9 or cutouts surrounding or at least sidewise of the openings 8 and thus of the projections 7 in the upper side of upper part 1 or in the underside.

After assembly of upper part 1 and lower part 2, blades 5 interdigit, and projections 7 extend through the free spaces 9 and, in the assembled state, the free spaces 9 are filled with a plastic mass 10. This connecting mass 10 is brought to free spaces 9 via coaxial rings 11 to 14. Rings 11 and 12 define the outer sides edges of upper part 1 and lower part 2. Ring 13 defines the outer edge of inlet opening or intake throat 4. Ring 13 is used as an axial mounting on the pump housing wall and thus as a sealing surface on the pump housing inner wall.

Hub 3 can be a part made separately from parts 1 and 2. However, it can also be injected from the connecting mass, so that ring 14 is injection-molded as a single piece with hub 3. Further, in hub 3, an annular part can be coaxially molded, so form a stop for the shaft end of the drive motor.

The terms "3-D blades" and "three-dimensional blades 5" include doubly-bent or -folded blades, which, in the area of the inlet opening, are oriented with their leading edges 15 in a radial plane inclined with respect to the rotation axis and thereafter, doubly bent, extend between the upper part and the lower part, until they end at the outer rim of the impeller.

As those skilled in the art will appreciate, various changes and modifications are possible within the scope of the inventive concept. Therefore, the invention is not limited to the particular embodiments shown and described, but rather is defined by the following claims.

What is claimed is:

1. An impeller for a rotary pump having an annular upper part (1) defining a central inlet (4);

a circular disk-shaped lower part (2) adjacent to a drive of said pump; and a plurality of blades (5) secured between said upper part (1) and said lower part (2), wherein said upper part (1) and said lower part (2) are separate parts, connectable with each other;

some of said blades (5) are formed only on said upper part and remaining ones of said blades are formed only on said lower part;

each of said blades (5) has a free edge (6) remote from a connection of said blade to said part (1, 2), said edge being formed with a projection (7) which, when said upper part and lower part are assembled together, extends into a respective recess or opening (8) in that one of said upper and lower parts not formed with said blade (5); and said openings define free spaces (9) surrounding said projections (7), which free spaces (9) are, in an assembled state of said upper and lower parts, filled by injection of plastic material, thereby forming a connecting plastic mass (10) which secures each free edge to the other of said upper and lower parts.

2. An impeller according to claim 1, wherein every second one of said blades (5) is formed on said upper part (1) and remaining ones of said blades (5) are formed on said lower part (2).

3. An impeller for a rotary pump having an annular upper part (1) defining a central inlet (4);

a circular disk-shaped lower part (2) adjacent to a drive of said pump;

a plurality of blades (5) secured between said upper part (1) and said lower part (2), and a hub (3) formed in said lower part (2) for securing said lower part to a drive shaft of said pump, wherein said upper part (1) and said lower part (2) are separate parts, connectable with each other;

each blade (5) is formed only on said upper part or on said lower part;

each of said blades (5) has a free edge (6) remote from a connection of said blade to said part (1, 2), said edge being formed with a projection (7) which, when said upper part and lower part are assembled together, extends into a recess or opening (8) in that one of said upper and lower parts not formed with said blade (5); and said openings define free spaces (9) surrounding said projections (7), which free spaces (9) are, in an assembled state of said upper and lower parts, filled by injection of plastic material, and wherein said hub is formed in a common injection step with said plastic material injected into said free spaces.

4. An impeller according to claim 3, further comprising three coaxial rings, namely a first ring (11) defining an outer rim of said upper part (1), a second ring (12) defining an outer rim of said lower part (2), and a third ring (13) defining a rim of said central opening (4), formed of injected plastic material, connected to plastic material filling said free spaces (9) surrounding said projections (7).

5. An impeller according to claim 4, wherein said injected plastic material of said central opening (4) forms a sealing surface to a pump housing inner wall.

6. An impeller according to claim 3, wherein said hub (3) is connected to plastic placed in free spaces (9) located in said lower part (2).

7. An impeller according to claim 2, further comprising three coaxial rings, namely a first ring (11) defining an outer rim of said upper part (1), a second ring (12) defining an outer rim of said lower part (2), and a third ring (13) defining a rim of said central opening (4), formed of injected plastic material, connected to plastic material filling said free spaces (9) surrounding said projections (7).

8. A method of making an impeller for a rotary pump having an annular upper part (1) defining a central inlet (4);

a circular disk-shaped lower part (2);

a plurality of three-dimensionally curving blades (5) secured between said upper part (1) and said lower part (2); and a hub formed in said lower part (2) for securing said lower part to a drive shaft of said pump, comprising the steps of:

forming each of said upper and lower parts with a plurality of slot openings (8);

integrally forming some of said curving blades (5) projecting from said upper part (1), and integrally forming others of said curving blades (5) projecting from said lower part (2);

assembling said upper part and said lower part together such that a portion (7) of each blade (5) penetrates a respective one of the openings (8) in the one of said upper and lower parts, other than the part from which the blade projects; and applying a plastic mass (10) around each blade portion (7), thereby securing said blade portion in said respective opening (8).

9. The method of claim 8, wherein said integral forming step is performed by injection-molding.

10. The method of claim 8, wherein said assembling step includes arranging said blades projecting from said lower part (2) to interdigit with blades projecting from said upper part (1).

* * * * *